US012525666B2

(12) United States Patent
Ziegler

(10) Patent No.: US 12,525,666 B2
(45) Date of Patent: Jan. 13, 2026

(54) BATTERY COOLING DEVICE AND METHOD FOR COOLING A BATTERY CELL OF AN ELECTRICALLY POWERED AIRCRAFT

(71) Applicant: Volocopter GmbH, Bruchsal (DE)

(72) Inventor: Nils Ziegler, Bretten (DE)

(73) Assignee: Volocopter GmbH, Bruchsal (DE)

( * ) Notice: Subject to any disclaimer, the term of this patent is extended or adjusted under 35 U.S.C. 154(b) by 675 days.

(21) Appl. No.: 17/686,498

(22) Filed: Mar. 4, 2022

(65) Prior Publication Data

US 2022/0285758 A1 Sep. 8, 2022

(30) Foreign Application Priority Data

Mar. 5, 2021 (DE) .......................... 102021105375.7

(51) Int. Cl.
*H01M 10/6556* (2014.01)
*H01M 10/0525* (2010.01)
*H01M 10/613* (2014.01)
*H01M 10/625* (2014.01)
*H01M 10/643* (2014.01)
*H01M 10/6554* (2014.01)

(52) U.S. Cl.
CPC ..... *H01M 10/6556* (2015.04); *H01M 10/613* (2015.04); *H01M 10/625* (2015.04); *H01M 10/6554* (2015.04); *H01M 10/0525* (2013.01); *H01M 10/643* (2015.04); *H01M 2220/20* (2013.01)

(58) Field of Classification Search
CPC ........... H01M 10/6556; H01M 10/613; H01M 10/625; H01M 10/6554
USPC .......................................................... 429/120
See application file for complete search history.

(56) References Cited

U.S. PATENT DOCUMENTS

| 2012/0261522 | A1 | 10/2012 | Droney |
| 2014/0287292 | A1* | 9/2014 | Baumgart ........... H01M 10/653 |
| | | | 165/104.11 |
| 2015/0037647 | A1 | 2/2015 | Nguyen et al. |
| 2018/0361866 | A1 | 12/2018 | Ferran et al. |

(Continued)

FOREIGN PATENT DOCUMENTS

| DE | 4013269 | 10/1991 |
| DE | 102010055600 | 6/2012 |

(Continued)

*Primary Examiner* — Allison Bourke
*Assistant Examiner* — Robert Gene West
(74) *Attorney, Agent, or Firm* — FIG. 1 Patents

(57) ABSTRACT

A battery cooling device (6) for cooling at least one battery cell (5) of an electrically operated aircraft is provided, the battery cooling device (6) having a first cooling device (7, 8) configured for absorbing a first amount of heat at least from the battery cell (5) in an electrical discharging process and thereby cooling it. The first cooling device has at least one latent heat storage unit with a variable state of aggregation. The battery cooling device (6) also includes a second cooling device (9), which is configured for absorbing a second amount of heat from the battery cell (5) and the first cooling device in an electrical charging process, the second cooling device (9) being able to be filled with and flowed through by a coolant (13). Furthermore, the invention relates to a method for cooling a battery cell of an electrically powered aircraft.

11 Claims, 7 Drawing Sheets

(56) References Cited

U.S. PATENT DOCUMENTS

| | | |
|---|---|---|
| 2019/0259998 A1 | 8/2019 | Yang et al. |
| 2019/0273295 A1* | 9/2019 | Chan .................. H01M 10/613 |
| 2020/0194852 A1 | 6/2020 | Muniz et al. |
| 2020/0339010 A1 | 10/2020 | Villanueva et al. |
| 2024/0034461 A1* | 2/2024 | Moore ................ B64D 11/003 |

FOREIGN PATENT DOCUMENTS

| | | | |
|---|---|---|---|
| DE | 102012202698 | 8/2013 | |
| DE | 202016008455 | 3/2018 | |
| DE | 102019212861 A1 * | 3/2021 | |
| JP | 2018206605 | 12/2018 | |
| WO | WO-2017016829 A1 * | 2/2017 | ............. F28F 1/022 |
| WO | 2020197982 | 10/2020 | |

* cited by examiner

BATTERY COOLING DEVICE AND METHOD FOR COOLING A BATTERY CELL OF AN ELECTRICALLY POWERED AIRCRAFT

INCORPORATION BY REFERENCE

The following documents are incorporated herein by reference as if fully set forth: German Patent Application No. 10 2021 105 375.7, filed Mar. 5, 2021.

TECHNICAL FIELD

The invention relates to a battery cooling device for cooling a battery cell of an electrically powered aircraft. The invention also relates to a battery module, to a vertical takeoff and landing aircraft, and also to a battery charging system. Furthermore, the invention relates to a method for cooling a battery cell of an electrically powered aircraft.

BACKGROUND

Electrically powered or partly electrically powered (hybrid) aircrafts are usually supplied with power by means of batteries. Generally, secondary batteries, i.e. rechargeable storage batteries, which have to be changed at regular intervals, are used for this.

DE 10 2012 202 698 A1 discloses an electrically powered aircraft which comprises at least one battery cell and a plurality of electrical drive units. The battery cell is used for storing and delivering electrical energy required for operating the electrical drive units of the aircraft.

During the operation of the aircraft, the battery cell becomes discharged in an electrical discharging process. The discharging process takes place during energy-intensive operational flight of the aircraft, for instance when it is climbing or turning in flight but also when it is flying horizontally or gliding. Similarly, the discharging process may already begin before operational flight, for instance when electrical energy is required for electronic systems or auxiliary units on board the aircraft.

Before the aircraft can resume its further operation, the discharged battery cell must be recharged in an electrical charging process. In contrast to the discharging process, the charging process usually takes place when the aircraft is in an inactive state. In this case, the battery cell is connected to a voltage source, which restores the state of charge of the battery cell. Consequently, the term 'battery cell' extends to rechargeable electrical storage batteries. In the following, the terms battery, battery cell and storage batteries are used interchangeably.

Both the discharging process and the charging process of the battery cell take place by way of chemical reactions in the battery cell. These reactions are accompanied by heat generation in the battery cell. In principle, said heat generation is dependent on the discharging rate and the charging rate of the battery cell, that is to say the amount of electrical power delivered or taken up by it. The heat occurring during the discharging process and the charging process can be removed by means of a battery cooling device.

Battery cooling devices with air cooling are known from the prior art. For this, a plurality of lithium-ion round cells are arranged at large distances from one another. This creates between the lithium-ion round cells gaps in which an air stream can flow and/or circulate. This air stream provides convective removal of heat via the surfaces of the battery cells. The disadvantage here is that large distances between the battery cells are accompanied by the need for a correspondingly large installation space.

Battery cooling devices with cooling plates through which liquid cooling media flow are also known. Such a cooling plate may be in thermal contact with a battery cell to be cooled and may be connected to a cooling circuit. By appropriately setting the level of the cooling capacity of the cooling circuit, a great amount of heat can be removed in a short time. If the cooling capacity is high, the surface area required for thermal contact between the battery cell and the battery cooling device can also be given small dimensions. The cooling plate may be arranged to the side of, above or below one or more battery cells. The disadvantage of such a battery cooling device is that the cooling media used are flammable and environmentally harmful, and the cooling device has a high weight that must be carried in the aircraft.

Latent heat storage units, see US 2015/037647 A1, are another possibility known from the prior art for removing heat from a battery cell. In contrast to conventional materials, these have a constant phase transition temperature. This means that heat can be added to or removed from the latent heat storage unit during the change that its state of aggregation undergoes, without its temperature changing. Rather, by absorbing heat, a phase transition of the phase change material (PCM) of the latent heat storage unit takes place, for example from solid to liquid/viscous.

This is advantageous in particular for cooling purposes in aircrafts, since heat generated by the battery cells can be transferred to the latent heat storage unit. As this happens, the temperatures of the battery cell or the battery cooling device do not change significantly, but instead the described phase transition of the latent heat storage unit takes place, for example from solid to liquid/viscous. Before further operation of the battery cooling device, this phase transition must be reversed by cooling of the latent heat storage unit, in order to be able to achieve a good cooling effect again.

SUMMARY

The invention is based on the object of overcoming the disadvantages of battery cooling devices that exist in the prior art. In particular, it is intended to propose a battery cooling device which has a low weight along with a compact structural design and can be made ready for use in operational flight in a short time.

The object is achieved by a battery cooling device having one or more of the features disclosed herein. Advantageous configurations of the battery cooling device can be found below and in the claims. The object is further achieved by a battery module having one or more of the features disclosed herein and its advantageous configurations as described below and in the claims. The object is also achieved by a vertical takeoff and landing electrical aircraft having one or more of the features disclosed herein and its advantageous configuration as described below and in the claims. Similarly, the object is achieved by a battery charging system having one or more of the features disclosed herein. The object is also achieved by a method having one or more of the features disclosed herein. Advantageous configurations of the method can be found below and in the claims. To avoid repetition, these claims are hereby explicitly included in the description by reference.

In the case of the battery cooling device according to the invention for cooling at least one battery cell of an electrically operated aircraft, the battery cooling device comprises, as known per se, a first cooling device, which is configured for absorbing a first amount of heat at least from the battery cell in an electrical discharging process of the battery cell and thereby cooling it, the first cooling device comprising at least one latent heat storage unit with a variable state of aggregation.

It is essential for the battery cooling device according to the invention that a second cooling device is provided, configured for absorbing a second amount of heat from the battery cell and the first cooling device, the second cooling device being able to be filled with and flowed through by a coolant.

The invention is based on the finding made by the applicant that a combination of a first, permanent cooling system with a latent heat storage unit and a second, contingent cooling system for cooling the latent heat storage unit leads to a comparatively lightweight and dependable cooling system.

The cooling device according to the invention therefore differs in essential aspects from previously known cooling devices: in addition to the first cooling device in the form of a latent heat storage unit, a second cooling device is provided in order to remove heat from the first cooling device and thereby reverse the phase transition of the latent heat storage unit (in the following also referred to as the reverse reaction or restoration of the functional capability of the first cooling device). For this purpose, the second cooling device is arranged in thermal operative connection with the latent heat storage unit and can be filled with and flowed through by a coolant.

As described above, the discharging process of at least one battery cell of the aircraft takes place primarily during operational flight. The first amount of heat thereby occurring is removed to the latent heat storage unit. During operational flight, the heat can therefore be removed by a battery cooling system, which has a comparatively low weight.

The latent heat storage unit is very suitable for this, since it preferably comprises materials such as paraffin or ester compounds, which can be incorporated extremely beneficially in a polymer matrix. These materials have in each case a comparatively low density with at the same time a great amount of latent heat.

During the discharging process, the first amount of heat is absorbed by the first cooling device with the latent heat storage unit, a phase transition occurring in the latent heat storage unit. The first amount of heat is in this case variable and does not necessarily correspond to the heating of the battery due to the discharging process.

For removing the stored heat in the latent heat storage unit, and consequently for reversing the phase transition in the latent heat storage unit, according to the invention the second cooling device is filled with the coolant and flowed through by it. This produces a thermally conducting connection with which both the first amount of heat, which is stored in the latent heat storage unit, and further heat, which possibly occurs due to the charging process, can be removed. As a result, a high cooling capacity can be realized.

The connection of the second cooling device to a cooling unit may preferably take place during the charging process of the battery. For charging, the battery cell is connected to a voltage source, as known per se. At the same time, the second cooling device may be filled with the coolant and flowed through by it. Preferably, the charging and the restoration of the functional capability of the first cooling device take place when the battery, or the battery module, is changed.

The separation into a first cooling device and a second cooling device means that no heavy units are required in order to be able to operate the battery cooling device during the discharging process, in particular in operational flight. In particular, heavy and complex parts such as compressors, pumps, valves, heat exchangers, etc. can be arranged outside the aircraft. This on the one hand provides the advantage that these components do not have to be certified for transport and/or use on board an aircraft. On the other hand, the weight of the components is not as important outside the aerial device, and so particularly large and powerful components can be used, such as would not be practicable or suitable for use in the aircraft because of their weight.

It is also advantageous that the shape of the latent heat storage unit can be geometrically adapted to the form of the battery cell in an easy way. In the case of round cells, a latent heat storage unit may for example be designed in the form of a plate and with hole-like openings, into which the round cells can be at least partially inserted. As a result, the thermal contact required for the heat removal can be optimized.

It is similarly within the scope of the invention to use more than one latent heat storage unit. In particular, two or more latent heat storage units may be used, for example attachable symmetrically to the sides of the battery cell or a battery cell assemblage. This allows homogeneous cooling by the formation of two heat sinks, which has a positive effect on the aging of the battery cell. Moreover, the mass of the latent heat storage unit used can be adapted exactly to the required heating capacity during the discharging process, which makes it possible for the first cooling device to be of a minimal weight.

In an advantageous embodiment of the invention, the coolant is not permanently in the second cooling device. Rather, the coolant is pumped through the second cooling device for the reverse reaction for the restoration of the functional capability of the first cooling device, in order to remove heat from the latent heat storage unit. Preferably, this only takes place after ending of the discharging process, in particular before or during or after the charging process of the battery.

Preferably, before the resumption of operational flight and a further discharging process, the coolant is pumped out of the second cooling device again. This has the effect of reducing the overall weight of the battery cooling device that is moved, in particular during operational flight. This has positive effects on the required cooling capacity of the battery cooling device: on account of the reduced weight, a low thrust has to be produced by the electrical drive units of the aircraft in order to make it possible for the aircraft to execute a flying movement. Accordingly, also lower electrical power has to be delivered by the battery cell. This leads in turn to a low discharging rate, and consequently to a lower generation of heat during the discharging phase. As a result, the battery cooling device as a whole can be made comp act.

The respective levels of cooling capacity of the first cooling device and the second cooling device can to the greatest extent be set independently of one another. In particular, the first amount of heat is not in a fixed ratio to the second amount of heat. One reason for this is that the latent heat storage unit of the first cooling device can radiate or convectively remove to its surroundings part of the stored first amount of heat between the discharging process and the charging process. Furthermore, during the charging process, in particular a rapid charging process, additional heat may occur in the battery cell and similarly has to be removed.

Therefore, as a maximum, the second amount of heat consists in total of the first amount of heat and an additional charging heat of the battery cell. It is however likewise within the scope of the invention that these amounts of heat differ from one another, since, as described, heat is actively or passively removed by way of other channels or additional heat occurs due to further processes and/or components.

Advantageously, the second cooling device is designed in such a way that the removable second amount of heat allows a reverse reaction of the phase transition of the latent heat storage unit of the first cooling device for the restoration of the functional capability of the first cooling device. Alternatively, the cooling capacity of the first cooling device may be adapted to the first amount of heat of the battery cell that can be generated as a maximum, and so the phase transition is possibly not entirely completed.

Also, neither the first amount of heat nor the second amount of heat has to be in a fixed ratio to the latent amount of heat of the latent heat storage unit of the first cooling device. Rather, it is within the scope of the invention that the first amount of heat may correspond in absolute terms to the latent amount of heat, but may also be lower or higher. It is however advantageous to design the latent heat storage unit of the first cooling device such that the amount of heat of the battery likely to occur in operational flight can be absorbed.

In order to make reliable operation of the battery cooling device possible, the temperature of the battery cooling system may be monitored by a temperature sensor. If said temperature exceeds a permissible upper limit, this can be detected by the temperature sensor and operational flight interrupted for cooling purposes.

In an advantageous configuration of the battery cooling device, the second cooling device has a flexible tube, which can be filled with a coolant and flowed through by it. The tube is in particular configured for indirectly or directly exerting a pressing pressure on the battery cell and/or the first cooling device when the coolant flows through. This provides the advantage that a thermal connection between the tube with the coolant and the battery cell and/or the first cooling device can be established in an easy way.

Making a flexible tube part of the second cooling device has the advantage that said tube has a deformable, pliant outer shape. This leads to advantages when constructing the battery cooling device in a way suitable for assembly: bulky components, such as for example an assemblage of multiple battery cells, or the latent heat storage unit can be preassembled in a first assembly step. When doing so, problematic contours may arise. In a second assembly step, the flexibly configured tube can be adapted to the geometry of the preassembled components and made to bypass the problematic contours. At the same time, the said problematic contours may be used for easy positioning of the pliant tube. In contrast to a rigidly designed first cooling device, the flexible tube can be changed as and when needed, with correspondingly little disassembly effort.

The pressing pressure represents an influencing factor in the heat transfer by thermal contact. It applies in principle that: the higher the pressing pressure, the higher the transferable heat by means of thermal contact. In this sense, the flexibility of the tube can be used to set the pressing pressure directly by way of the pressure of the cooling medium: if the flexible tube is filled with a coolant that is under pressure, the tube expands. If the tube is in thermal contact with components to be cooled, the pressing pressure is increased, whereby the removable amount of heat increases. By additional detection of the temperature of the components to be cooled and a settable delivery pressure, for example the delivery pressure of a pump, indirect feedback control of the cooling can in this way be realized.

For a direct transfer of the pressing pressure, the tube may be in direct contact with the first cooling device and/or the battery cell.

In a further preferred configuration, the second cooling device can be connected in a thermally conducting manner to the battery cell by way of a first intermediate layer, the first intermediate layer being electrically insulating.

Providing an electrically insulating intermediate layer between the second cooling device and the battery cell is accompanied by the advantage that electrically conductive materials can be used for forming the second cooling device. Without an insulating layer, they would lead to a short circuit of the battery cell or the plurality of battery cells. In particular, the use of metallic materials for the second cooling device is made possible by the electrically insulating first intermediate layer. In addition to the known low ohmic resistance, they can in each case have a high mechanical strength. A high strength is advantageous in order that the second cooling device can be subjected to high mechanical loading, for example in the form of a high internal pressure due to the coolant.

In a further preferred configuration of the battery cooling device, the second cooling device can be connected in a thermally conducting manner to the first intermediate layer by way of a second intermediate layer and the second intermediate layer has a higher mechanical stiffness and/or strength than the first intermediate layer.

Forming the second intermediate layer with an increased mechanical stiffness allows the second cooling device, which preferably comprises a flexible tube, to be protected from sharp-edged geometrical elements of the battery cell and of the first cooling device. Moreover, a high degree of functional separation can be achieved between the first intermediate layer and the second intermediate layer. As a result, the first intermediate layer can be dimensioned primarily with consideration for the desired electrical installation, while the second intermediate layer can be designed primarily for the mechanical protection of the second cooling device. If one of the two intermediate layers has a defect, a functional separation means that it is possible for only the defective intermediate layer to be changed, whereby the costs for parts and the time taken for assembly are reduced.

The object according to the invention is likewise achieved by a battery module with one or more of the features disclosed herein. The battery module according to the invention comprises the battery cooling device according to the invention or an advantageous configuration of the battery device and also at least one battery cell, preferably a plurality of battery cells.

In an advantageous embodiment of the invention, the battery module has a housing, which offers electrical insulation of current-carrying components of the battery cell and mechanical protection from external influences. Moreover, the battery module may have mechanical interfaces, for example in the form of lead-in bevels, bearing surfaces or connecting elements with which the battery module can be arranged and fixed in the aircraft in a spatially defined manner. Furthermore, the battery module preferably has at least one electrical interface, for example in the form of a plug-in, clamp or pressure contact, by way of which the battery cell of the battery module can be connected to the electronic systems on board the aircraft, for example power electronics. Preferably, the battery module has sensors or sensor interfaces for sensors, with which the state of the battery cell and the battery cooling device can be monitored, and if appropriate controlled, in interaction with a battery management system of the aircraft.

The battery cell of the battery module may be designed as a round cell, pouch cell or prismatic cell, which are in each case accompanied by the advantages known from the prior art.

Furthermore, the battery cell may have a safety valve in the form of a venting valve. If overheating of the battery cell that leads to a fire occurs, the venting valve can open of its own accord and release the hot, burning gas from the battery cell in the event of a thermal runaway of the battery. In this case, the latent heat storage unit of the first cooling device can positively influence the way in which the battery cell burns by an additional phase transition from liquid/viscous to gaseous.

In a preferred embodiment of the battery module, it comprises a fire protection material, which at least partially encloses the battery cell.

As known from the prior art, the fire protection material has a low thermal conductivity and separates the battery cell thermally from other battery cells, the components of the battery cooling device and the electrically operated aircraft.

A functional separation of the fire protection material from the first and second cooling devices allows advantages to be achieved in the shaping of the battery module. In particular, a functional separation is accompanied by advantages in the dimensioning of the components of the battery module: the fire protection material can be designed independently of the first and second cooling devices solely for minimizing a risk of fire, whereas the first and second cooling devices can be optimized solely for the cooling effect to be achieved.

Latent heat storage units can in principle be combined with fire protection materials in a common matrix to form a composite material. However, such a composite material generally has a high density, which leads to a correspondingly high overall weight of the battery module. For this reason, separate formation of the fire protection material and the battery cooling device leads to a weight saving.

The fire protection material is advantageously of an intumescent form. When excessive heat is generated, there is an increase in the volume of the fire protection material. As a result, any gaps that exist between the battery cells can be closed by a heat-insulating layer. However, it goes without saying that other fire protection materials that are known to a person skilled in the art can also be used.

In a further advantageous configuration, the battery module has a busbar, to which the battery cell is connected in an electrically conductive manner by way of a wire bond.

The busbar may be designed as a sheet-metal element that is easy to produce and at the same time lightweight. It serves on the one hand for electrically contacting at least one battery cell and/or interconnecting a number of like-poled terminals of a plurality of battery cells. On the other hand, it serves as a common electrical interface of the battery module for the electronic systems, in particular the power electronics, on board the aircraft. By means of the busbar, a number of battery cells can be electrically connected in parallel in an easy way, whereby the electrical capacity of the battery cells can be increased. Similarly, a series connection can be realized, in order to increase the voltage provided by the battery cells.

A wire bond may consist of a lightweight, bent wire, the ends of which are respectively used for the electrical contacting of the busbar and a battery cell. Preferably, the ends of the wire bond are connected to the busbar and to the respective battery cell in a material-bonding manner, for example by means of soldering. A further advantage of wire bonds is that they can be applied in a way that can be automated well.

In a further preferred configuration of the battery module, the battery module comprises at least two battery cells, preferably more than two battery cells. Preferably, the battery cells are in each case configured as a cylindrical round cell with a negatively poled end face and with a positively poled end face, the round cells in particular preferably being arranged parallel to one another and the negatively poled end faces of all of the battery cells being arranged on a first side of the battery module and the positively poled end faces of all of the battery cells being arranged on a second side of the battery module.

Round cells have a high mechanical bending stiffness in comparison with pouch cells or prismatic cells. A parallel arrangement of all of the battery cells therefore allows the overall stiffness of the battery module to be increased. As a result, the risk of damage to the battery cells due to excessive deformation as a result of external effects on the battery module is reduced.

An arrangement of the battery cells in which the negatively poled end faces are arranged on the first side of the battery module and the positively poled end faces are arranged on the second side of the battery module allows the assembly of the battery module to be simplified. In particular, automated electrical contacting of the battery cells, preferably with a busbar by way of wire bonds, can be simplified. In particular, the polarity of said battery cells does not have to be taken into consideration. As a result, detrimental reversal of the polarity of the battery cells is ruled out.

The object according to the invention is likewise achieved by a vertical takeoff and landing, electrically powered aircraft with the features of claim 9. The vertical takeoff and landing, electrically powered aircraft according to the invention is formed with a battery module which comprises a battery cooling device according to the invention.

In addition to the battery module, the vertical takeoff and landing, electrical aircraft preferably has in particular the features known from DE 10 2012 202 698 A1. Said features are hereby included to their full extent in the description by reference.

In a preferred configuration of the vertical takeoff and landing, electrically powered aircraft, the aircraft has connecting means which are configured to connect the battery module mechanically and electrically to drive units of the aircraft in the operating state (usually during flight), these connecting means being releasably configured in order to disconnect the battery module from the aircraft for a charging process of the battery cell.

The vertical takeoff and landing, electrically powered aircraft has a mechanical interface and an electrical interface. The mechanical interface is preferably arranged in the fuselage of the aircraft and serves the purpose of mechanically positioning and fixing the battery module. For this, the aircraft may have latching or clamping elements, which make it possible for the battery module to be fixed in a force-fitting or form-fitting manner. In particular, said fixing is releasable, and so the battery module can be attached in the aircraft for the discharging process and disconnected and removed from it for the charging process of the aircraft. This allows almost uninterrupted operational flight of the aircraft, in that a battery module that has become discharged and heated is simply replaced by another battery module that has been charged and cooled.

The electrical contacting of the battery cooling module takes place by way of the electrical interface on the aircraft. This electrical interface may be designed for example in the form of a plug-in, clamp or pressure contact, which is electrically closed when the battery module is mechanically connected to the aircraft.

In an advantageous version of the invention, the vertical takeoff and landing aircraft and a ground charging station form a battery charging system. The ground station has an electrical charging device for the battery cell and a cooling unit and is configured for at least electrically contacting the battery module for the charging process and for connecting the second cooling device of the battery cooling device to a stationary coolant circuit of the cooling unit in a thermally conducting manner.

The ground charging station may advantageously comprise an electrical energy storage unit and also an electrical generator for power generation. For the charging process, the battery module is electrically contacted and can be charged directly by the electrical energy storage unit of the ground charging station. Alternatively or additionally, the electrical generator may be operated to generate power that is used for charging the battery cell of the battery module.

The cooling unit preferably comprises a stationary coolant circuit with a coolant reservoir, which is filled with the coolant. In addition, the coolant circuit may comprise a coolant pump, a heat exchanger and also a cooling controller. If the battery module is connected to the stationary coolant circuit by way of the inflow and outflow of the second cooling device, the pump begins with the delivery of the coolant. In particular, the pump allows the setting of a delivery pressure, in order that the pressing pressure of the second cooling device can be set manually or automatically. The cooling capacity that is required to remove the second amount of heat is provided by the heat exchanger. By detecting the temperatures of the coolant before it enters the second cooling device and after it exits, the cooling controller can set the cooling capacity according to requirements. As a result, in particular the length of time required for the removal of the second amount of heat can be adapted to the time required for the electrical charging process, in particular a rapid charging process of the battery cell.

In principle, the essential achievable advantage of the ground charging station can be seen in the fact that heavy components that are used in commonly encountered coolant circuits, such as for example pumps, compressors, condensers, expansion valves and evaporators, do not have to be transported in the aircraft. At the same time, the advantages of cooling devices based on the principle of heat removal by means of a coolant can be exploited.

The object according to the invention is likewise achieved by a method for cooling a battery cell of an electrically powered aircraft with one or more of the features described herein.

The method according to the invention is suitable in particular for being carried out by means of one of the battery cooling devices according to the invention or one of the described embodiments of a battery module according to the invention or an aircraft according to the invention.

The method according to the invention for cooling a battery cell of an electrically powered aircraft is carried out by a battery cooling device with a first cooling device in the form of a latent heat storage unit. The first cooling device in a method step A absorbs a first amount of heat which the battery cell dissipates.

It is essential that, in a method step B, a second cooling device of the battery cooling device absorbs a second amount of heat from the battery cell and/or the first cooling device.

The method according to the invention likewise has the stated advantages of the battery cell according to the invention or of the preferred embodiments.

In a preferred embodiment of the method according to the invention, method step B is carried out before and/or during and/or after a charging process of the battery cell, in that a coolant is pumped into the second cooling device of the battery cooling device. In this case, the coolant of the second cooling device absorbs a second amount of heat from the battery cell and/or the first cooling device.

The first amount of heat and the second amount of heat may coincide, but they may also differ.

In a preferred embodiment of the method, during the absorption of the first amount of heat, the latent heat storage unit of the first cooling device changes its state of aggregation from solid to liquid/viscous and, during the dissipation of the second amount of heat, changes its state of aggregation from liquid/viscous to solid.

In a further preferred embodiment of the method, the battery cell with the battery cooling device is removed from the electrically powered aircraft before the charging process. The charging process takes place at a ground charging station. After completion of the reverse reaction for the restoration of the functional capability of the latent heat storage unit and/or after completion of the charging process, the coolant is pumped out of the second cooling device and the battery cell with the battery cooling device is fitted into the electrically operated aircraft.

The invention is suitable in particular for use in vertical takeoff and landing, electrically powered aircrafts of the applicant and also in battery modules of the applicant, such as for example in the applications "Battery cooling device with fire protection material, battery module with fire protection material and aircraft" and "Method for cooling a battery and cooling system" with the filing date of Mar. 5, 2020.

BRIEF DESCRIPTION OF THE DRAWINGS

Further preferred features and embodiments of the device according to the invention and of the method according to the invention are explained below on the basis of exemplary embodiments and the figures. These exemplary embodiments and any specified dimensions are merely advantageous configurations of the invention and are therefore not restrictive.

In the figures.

DETAILED DESCRIPTION

Figure 1:
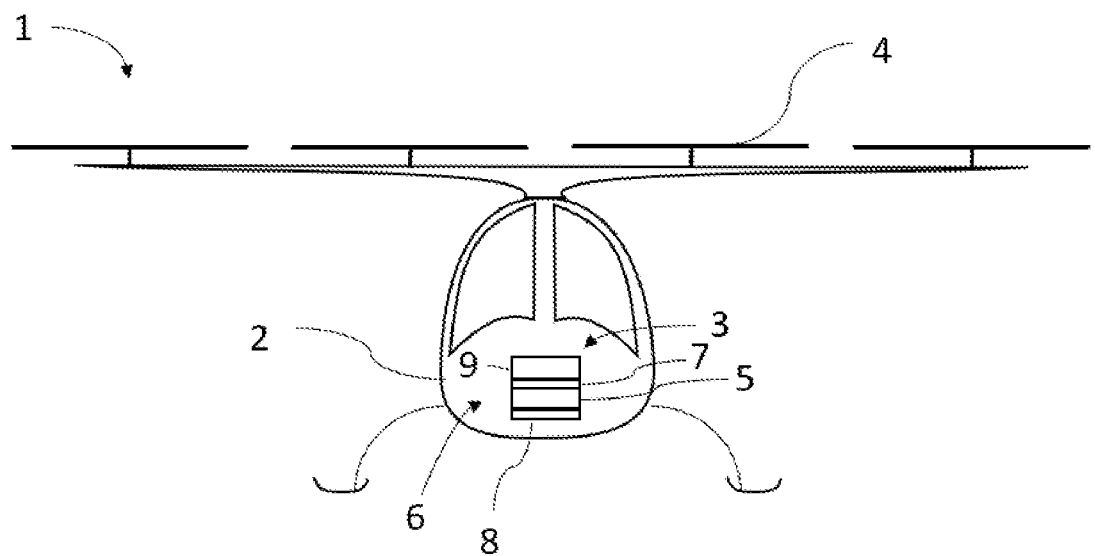
FIG. 1 shows an electrically powered multicopter with a battery module.

FIG. 1 shows an electrically powered multicopter 1 with a fuselage 2, in the interior space of which a battery module 3 is arranged. Above the fuselage 2, the multicopter 1 has a multiplicity of electrical drive units 4, which in each case comprise at least one electric motor and also a propeller.

The battery module 3 comprises a multiplicity of battery cells 5, which are designed as lithium-ion round cells, and also a battery cooling device 6 with a first cooling device in the form of a first latent heat storage unit 7 and a second latent heat storage unit 8 and a second cooling device in the form of a flexible cooling hose 9.

The battery cells 5 serve for the storage of electrical energy which is required for the operation of the electrical drive units 4. Since the battery cells 5 become electrically discharged during the operation of the drive units 4, they must be charged in a subsequent charging process. Chemical reactions in the battery cells 5 during the discharging process and also during the charging process cause heat, which must be removed by the battery cooling device 6. The heat flows thereby occurring are shown in FIGS. 2 and 3, with FIG. 2 showing the heat removal during the discharging process and FIG. 3 showing the heat removal during the charging process.

Figure 2:
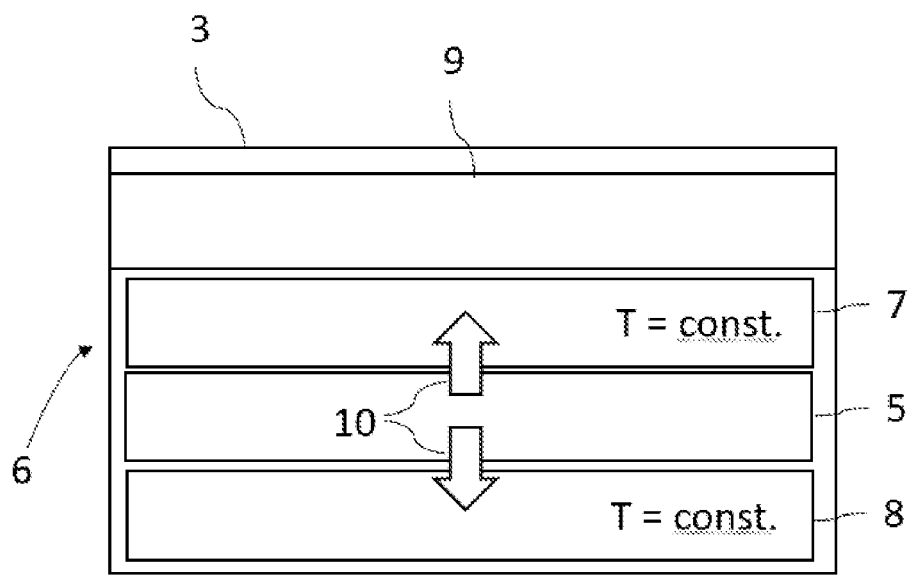
FIG. 2 shows a heat transfer of a first amount of heat within the battery module during the discharging process.
Figure 3:
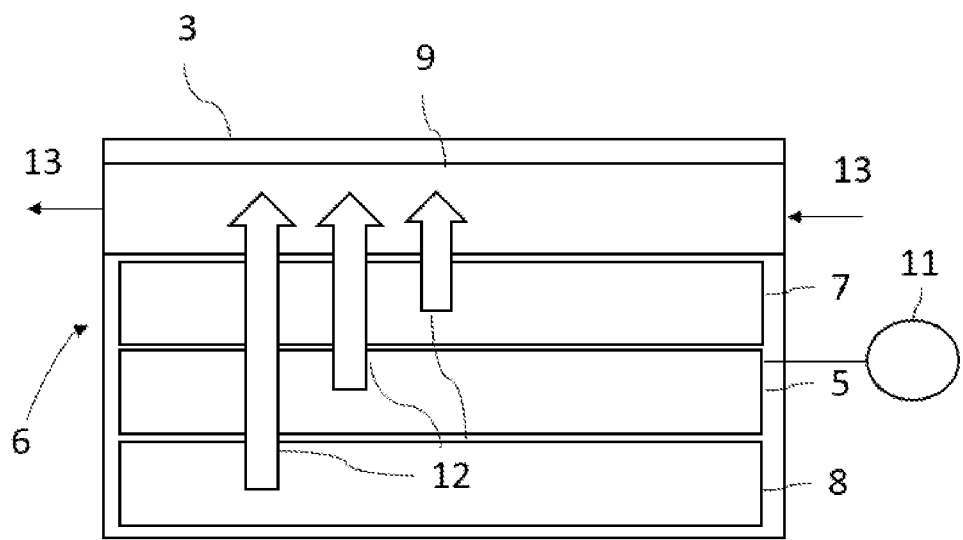
FIG. 3 shows a heat transfer of a second amount of heat of the battery module during the charging process.

FIG. 2 shows the essential transfers within the battery module 3 during the discharging process. In this case, the battery cells 5 are in thermally conducting contact with the first latent heat storage unit 7 and the second latent heat storage unit 8. During the discharging process, a first amount of heat 10 occurs and is dissipated to the latent heat storage units 7 and 8 by way of the respective thermally conducting contact. During the discharging process, no heat transfer or only a minor heat transfer takes place to the flexible cooling hose 9. It may be that, at most, the material from which the cooling hose is produced heats up, but this does not lead to any appreciable cooling of the battery cell.

On account of the characteristic properties of the latent heat storage units, the temperatures of the first latent heat storage unit 7 and the second latent heat storage unit 8 do not increase during the discharging process. Rather, a phase transition of the phase change material, for example from solid to liquid/viscous, takes place in the latent heat storage unit due to the absorption of the amount of heat. Since the heat is nevertheless removed from the battery cells 5, excessive heat generation in the battery module 3 is avoided.

After the discharging process has ended, the battery cells 5 must be electrically charged in a charging process. Before the further operation of the battery cooling device, a phase transition of the phase change material must also be reversed by cooling of the latent heat storage unit, in order once again to achieve a good cooling effect. This is shown in FIG. 3. In this case, the battery cells 5 of the battery module are electrically connected to a stationary energy storage unit 11 and also a coolant circuit (not shown) of a ground charging station (not shown). The electrical contacting allows the electrical state of charge of the battery cells 11 to be restored. The thermally conducting contacting with the coolant circuit has the effect that a coolant is pumped into the flexible cooling hose 9. As a result, both the heat occurring during the charging process in the battery cells 5 and the first amount of heat 10 already stored in the latent heat storage units 7 and 8 are together removed in the form of a second amount of heat 12.

Figure 4:
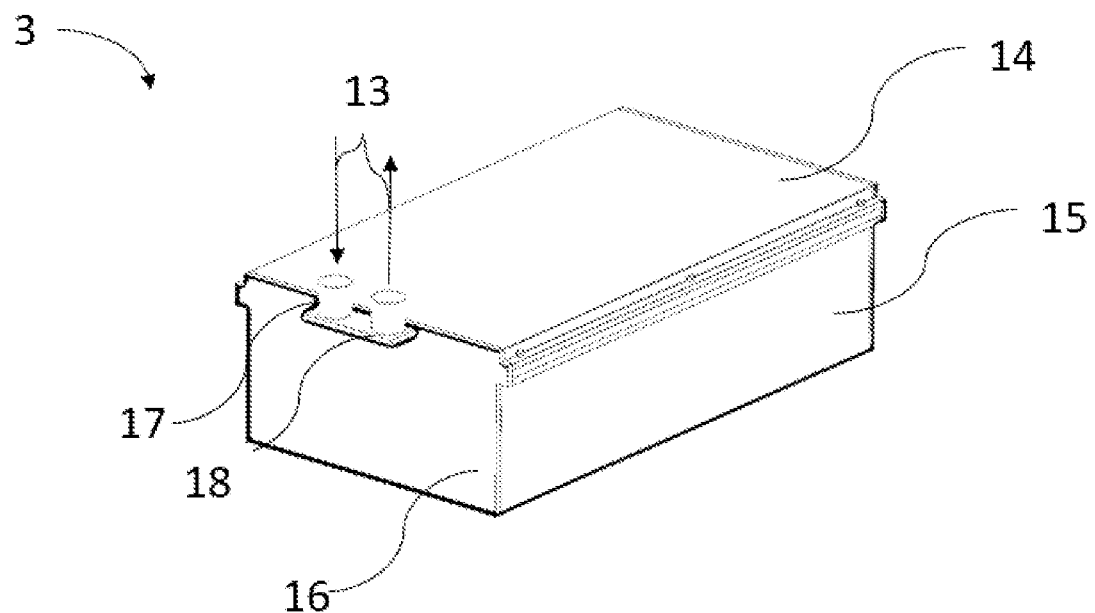
FIG. 4 shows an isometric view of the battery module.

FIG. 4 shows a structural exemplary embodiment of the battery module 3. The battery module 3 has a housing with a cover 14, side walls, of which a first side wall 15 is shown, end walls, of which a first end wall 16 is shown, and also a base (which cannot be seen here). The cover 14 is releasably screwed to the side walls and the end walls. The housing components together form an interior space, arranged in which are, inter alia, the battery cells 5 and the battery cooling device 6.

In the region of the first end wall 16 there are an inflow connection 17 and an outflow connection 18 of the already described flexible cooling hose. For the cooling of the battery module 3, during the charging process the coolant 13 is pumped through the inflow connection 17 into the interior space of the battery module 3 and leaves again from the outflow connection 18.

Figure 5:
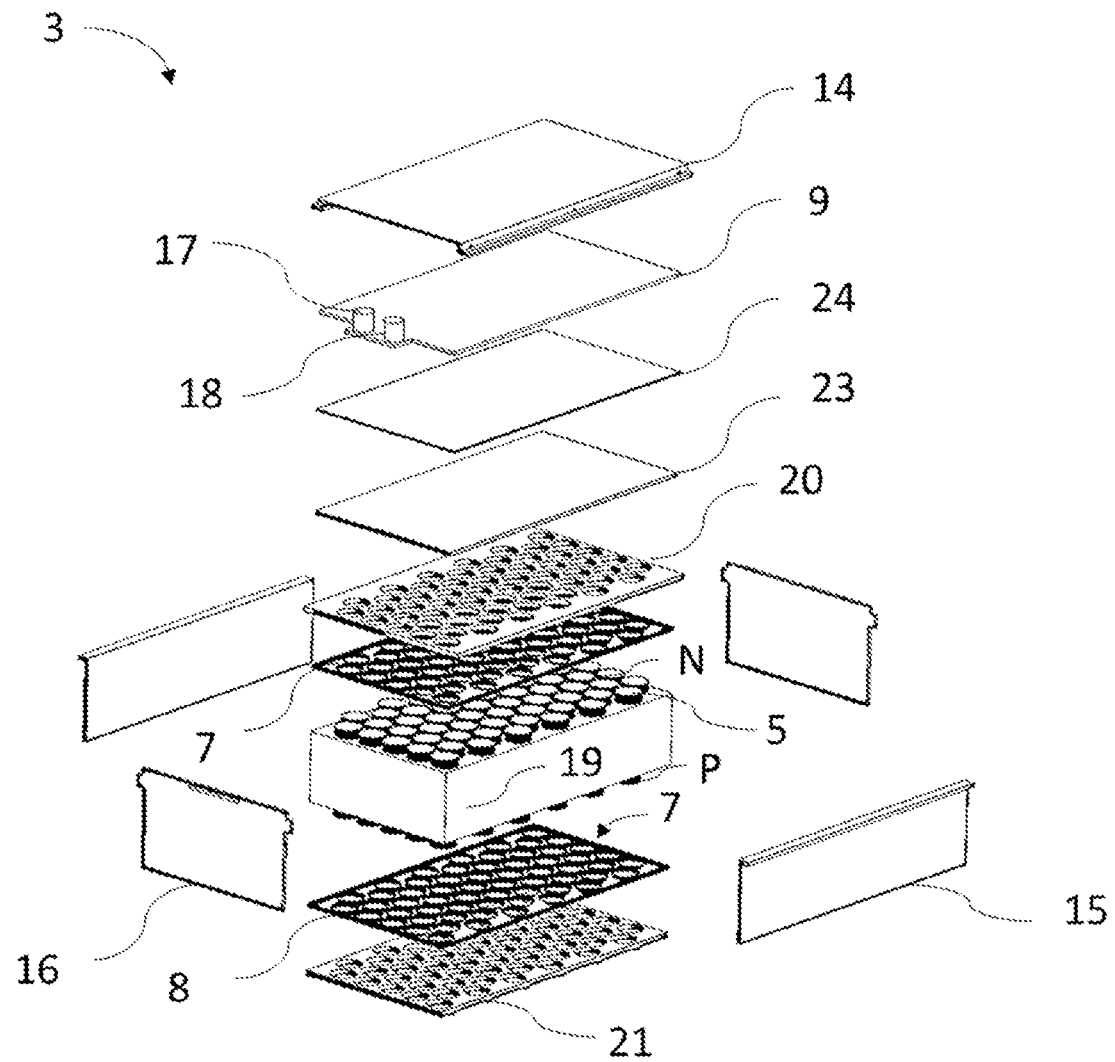
FIG. 5 shows an exploded view of the battery module.
Figure 6:
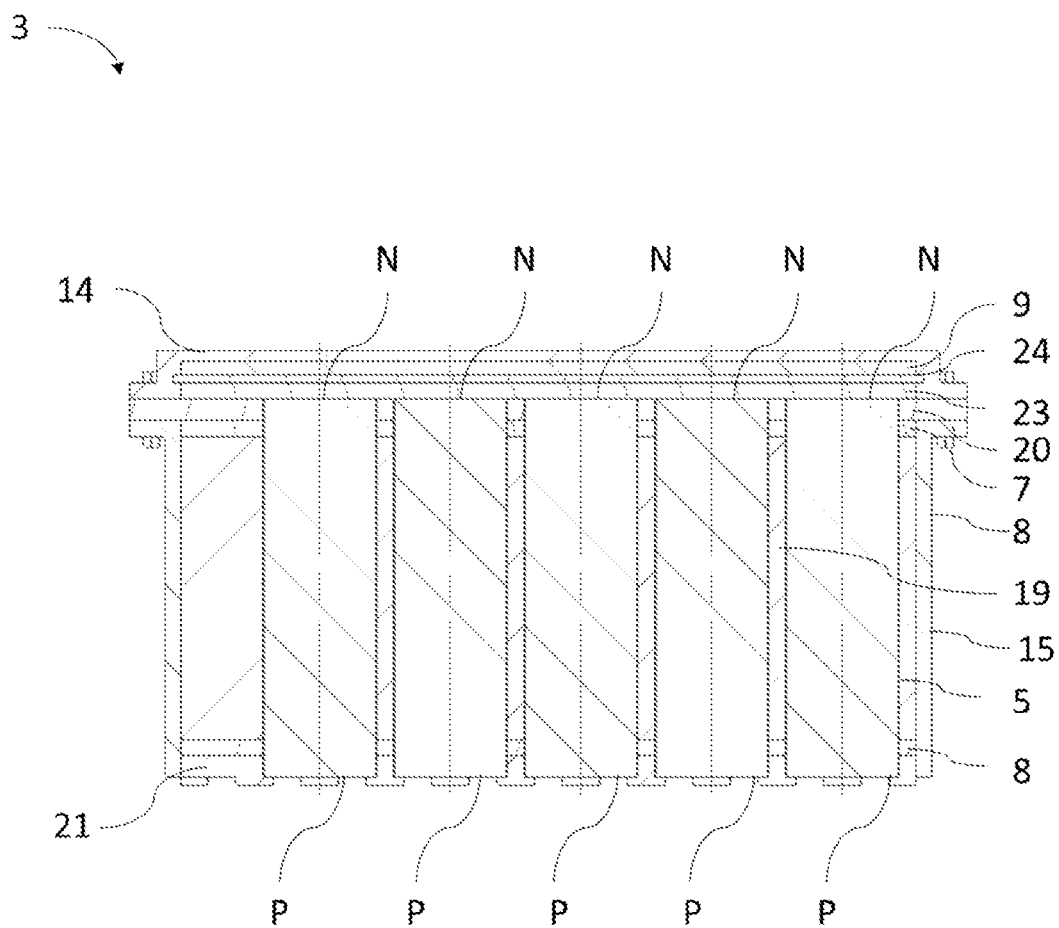
FIG. 6 shows a frontal sectional view of the battery module.

FIG. 5 shows an exploded representation of the battery module 3, which is shown in the assembled state in FIG. 4. FIG. 6 shows a frontal sectional view of the same battery module. The following statements therefore apply both to FIG. 5 and to FIG. 6.

The battery cells 5 of the battery module are designed as lithium-ion round cells and are arranged parallel to one another. The battery cells 5 have end faces, all of the negative poles N facing upward according to the representation shown. Furthermore, all of the positive poles P face downward. As a result, all of the negative poles N are contacted with one busbar (not shown) and all of the positive poles P are contacted with another busbar (not shown) by way of wire bonds in an easy way.

The battery cells 5 are enclosed by an intumescent fire protection material 19 in the regions in which their respective electrodes are located. The end regions of the battery cells 5 are not enclosed by the fire protection material 19. This has the effect of creating in said regions of the end faces an installation space in which the first latent heat storage unit 7 and the second latent heat storage unit 8 can be arranged. The latent heat storage units 7 and 8 are designed as perforated plates. The holes of the perforated plates essentially correspond in their dimensions and relative position on the respective perforated plate to the dimensions and positions of the battery cells 5. As a result, for the assembly of the battery module 3, both the first latent heat storage unit 7 and the second latent heat storage unit 8 can be connected to the battery cells 5 in a form-fitting manner. This produces a direct thermal contact between battery cells 5 and latent heat storage units 7, 8.

In order that neither the safety-relevant latent heat storage units 7, 8 nor the fire protection material 19 are excessively mechanically loaded, a first cell holder 20 and a second cell holder 21 are arranged above and below the latent heat storage units 7, 8. The cell holders 20, 21 serve for the spatial fixing of the battery cells 5 in the housing of the battery module 3, and so any forces on the battery cells 5 that may occur do not have to be supported by the aforementioned safety-relevant components.

The flexible cooling hose 9 is in the present case designed as a lightweight component and is arranged under the cover 14. In order to avoid a short circuit of the battery cells 5 through the cooling hose 9, it is separated from the battery cells 5 by an electrically insulating thermal pad 23. In order to improve the cooling effect of the flexible cooling hose 9, it may be subjected to a high internal pressure. As result, the cooling hose 9 expands and exerts a correspondingly high pressing pressure on the components to be cooled of the battery module 3. In order that the cooling hose 9 is not damaged by sharp-edged contours of the battery module 3 and the pressing pressure can be distributed uniformly among the components to be cooled, a metal plate 24 with a high bending stiffness is arranged between the thermal pad 23 and the cooling hose 9.

Figure 7:
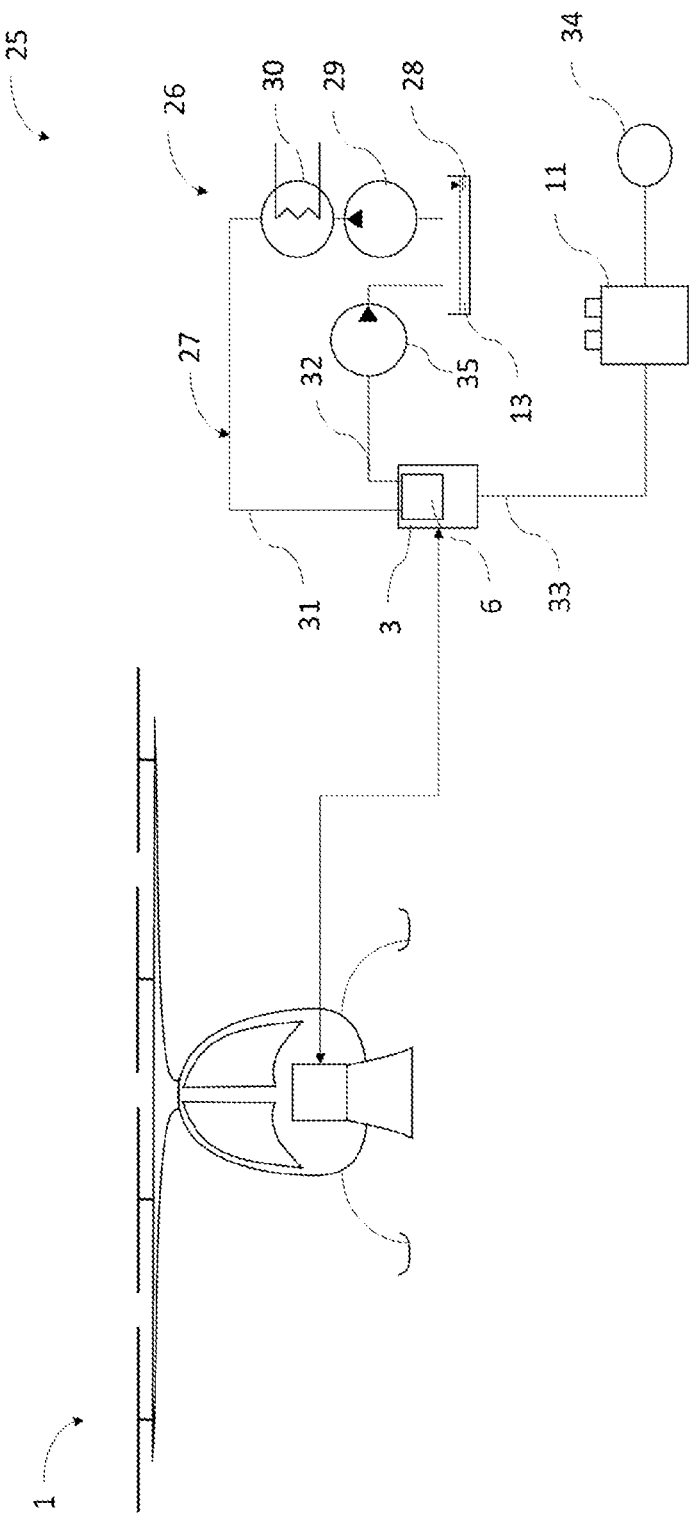
FIG. 7 shows a battery charging system with the multicopter and a ground charging station.

FIG. 7 shows a battery charging system 25 with the multicopter 1 and a ground charging station 26. The charging process of the battery outside or inside the aircraft can be used to return the "spent" latent heat storage unit to the initial state, i.e. to return the liquid/viscous latent heat storage unit again to a solid state of aggregation. For this purpose, the battery together with the battery cooling device may be removed from the aircraft and contacted, or alternatively remain in the aircraft.

For this purpose, the ground charging station 26 comprises a cooling circuit 27 with a coolant tank 28 and the coolant 13 contained therein. A pump 29 pumps the coolant 13 through a heat exchanger 30 and via the inflow 31 into the flexible cooling hose 9 (cf. FIGS. 5 and 6) of the battery cooling device 6 of the battery module 3. Through the outflow 32, the heated coolant 13 returns to the coolant tank 28. At the same time, the battery cells 5 of the battery module 3 are electrically contacted with the stationary energy storage device 11 by way of the connection 33 and are charged. The energy storage unit 11 is connected to the generator 34, with which it can be charged after or during the charging process.

According to the invention, by the battery charging system shown, a phase transition of a heated-up latent heat storage unit is reversed by active cooling. In this case, the liquid/viscous latent heat storage units are returned to a solid state of aggregation.

After ending of the charging process, the coolant 13 is pumped out of the battery module 3 with a second pump 35, which is arranged in the outflow 32. As a result, the weight of the second cooling device is reduced in comparison with the filled state.

The invention claimed is:

1. A battery cooling device for cooling a battery cell of an electrically operated aircraft, the battery cooling device comprising:
   a first cooling device configured for absorbing a first amount of heat at least from the battery cell in an electrical discharging process, the first cooling device comprising at least one latent heat storage unit with a variable state of aggregation; and
   a second cooling device configured for absorbing a second amount of heat from the battery cell and the first cooling device, the second cooling device being able to be filled with and flowed through by a coolant,
   wherein the second cooling device has a flexible hose that is fillable with and flowed through by a coolant, and the flexible hose is configured to expand when the coolant flows through the flexible hose to exert a pressing pressure on the battery cell and the first cooling device,
   wherein the second cooling device is configured to connect to a pumping network for pumping the coolant through the second cooling device during charging of the battery cell, the pumping network being outside the electrically operated aircraft.

2. The battery cooling device as claimed in claim 1, wherein the second cooling device is connected in a thermally conducting manner to the battery cell by a first intermediate layer and the first intermediate layer is electrically insulating.

3. The battery cooling device as claimed in claim 2, wherein the second cooling device is connected in a thermally conducting manner to the first intermediate layer by a second intermediate layer and the second intermediate layer has a higher mechanical load-bearing capacity, than the first intermediate layer.

4. A battery module comprising the battery cooling device according to claim 1, and the battery cell.

5. The battery module as claimed in claim 4, further comprising a fire protection material, which at least partially encloses the battery cell.

6. The battery module as claimed in claim 4, further comprising a busbar, and the battery cell is connected to the busbar in an electrically conductive manner by at least one wire bond.

7. The battery module as claimed in claim 4, wherein the battery cell comprises at least two battery cells which are in each case configured as a cylindrical round cell with a negatively poled end face and with a positively poled end face, the round cells being arranged parallel to one another and the negatively poled end faces of all of the at least two battery cells being arranged on a first side of the battery module and the positively poled end faces of all of the at least two battery cells being arranged on a second side of the battery module.

8. A vertical takeoff and landing, electrically powered aircraft comprising the battery module as claimed in claim 4.

9. The vertical takeoff and landing, electrically powered aircraft as claimed in claim 8, further comprising a connector configured to connect the battery module mechanically and electrically to drive units of the aircraft in an operating state, the connector being releasably configured in order to disconnect the battery module from the aircraft for a charging process.

10. A battery charging system comprising: the vertical takeoff and landing aircraft as claimed in claim 8 and a ground charging station, the ground charging station has an electrical charging device for the battery cell and a cooling unit and is configured for electrically contacting the battery module for charging the battery cell and for connecting a second cooling system of the battery cooling device to a stationary coolant circuit of the cooling unit in a thermally conducting manner.

11. The battery cooling device as claimed in claim 1, wherein the flexible hose is configured to be in contact with both the battery cell and the first cooling device.

* * * * *